United States Patent [19]
Kowalczyk

[11] Patent Number: 5,862,235
[45] Date of Patent: Jan. 19, 1999

[54] MULTIPLE BROADCAST CHANNEL TRANSMITTER ARRANGMENT

[75] Inventor: David Anthony Kowalczyk, Syracuse, N.Y.

[73] Assignee: Thomas Consumer Electronics, Inc., Indianapolis, Ind.

[21] Appl. No.: 722,880

[22] Filed: Sep. 26, 1996

Related U.S. Application Data

[60] Provisional application No. 60/004,497 Sep. 27, 1995.

[51] Int. Cl.$^6$ .................................................. H04B 5/00
[52] U.S. Cl. ................................. 381/79; 381/77; 381/14
[58] Field of Search ................................ 381/14, 79, 16, 381/77; 455/59

[56] References Cited

U.S. PATENT DOCUMENTS

| | | |
|---|---|---|
| 2,686,256 | 8/1954 | Albersheim . |
| 3,662,268 | 5/1972 | Gans et al. . |
| 3,934,201 | 1/1976 | Majefski .................................. 381/14 |
| 5,319,716 | 6/1994 | McGreevy ............................... 381/79 |
| 5,491,839 | 2/1996 | Schotz ..................................... 381/79 |

OTHER PUBLICATIONS

Electronics Now, Sep. 1995 issue —pp. 46–56 entitled, "An All–Channels"FM Transmitter by Don Lancaster.

*Primary Examiner*—Forester W. Isen
*Attorney, Agent, or Firm*—Joseph S. Tripoli; Peter M. Emanuel; Kuniyuki Akiyama

[57] ABSTRACT

A transmitter includes a plurality of oscillators for transmitting multiple radio frequency (RF) signals simultaneously, from each one of which signals a broadcast radio receiver system can reproduce the transmitted audio information. The transmitter will not only allow a user to listen to a CD or tape player through the radio receiver system but also let the user choose whichever frequency gives the best quality sound by merely tuning the receiver system in the same manner as tuning it to the broadcast radio station signals.

1 Claim, 5 Drawing Sheets ns a radio frequency (RF) signal
MULTIPLE BROADCAST CHANNEL TRANSMITTER ARRANGMENT This application claims provisional Ser. No. 60/004,497 filed Sep. 27, 1995.

FIELD OF THE INVENTION

The invention relates to a radio frequency (RF) signal transmitting apparatus and particularly to apparatus of the kind transmitting audio information within a band of broadcast frequencies.

BACKGROUND OF THE INVENTION

An available RF transmitter allows a user to listen to a headphone-only portable audio unit (such as a portable stereo CD or tape player) through a radio receiver especially in the situations where headphones are not allowed or impractical, such as listening in a moving vehicle.

Currently known state of the art RF transmitters, such as an FM transmitter, intended for this purpose require a user in the vehicle to tune both the transmitter and the radio receiver. This approach is exemplified by U.S. Pat. No. 5,319,716 to William T. McGreevy, assigned to Recoton Corporation. McGreevy's invention involves a vehicle's passenger tuning the transmitter of an adapter to the same frequency as that of the tuner of the vehicle's FM radio receiver system.

However, tuning the transmitter in a moving vehicle could cause a serious safety concern especially when the user is the person who is driving. Safe operation of the vehicle could be jeopardized by a mental and physical distraction of the driver whenever he attempts to tune the transmitter. Moreover, it would not be easy for the driver to physically locate and tune the transmitter since, unlike a firmly installed car radio receiver, the transmitter is usually positioned unsteadily in the passenger compartment of the vehicle, together with a portable audio unit.

It is noted that retuning the transmitter may be necessary as the vehicle movers from one location to anther. This is because an open radio channel on which the transmitter is initially tuned in a particular geographical region may not be open (i.e., occupied by the local broadcast station) in another geographical region. Therefore, McGreevy's invention creates a possible safety problem for automobile users.

SUMMARY OF THE INVENTION

In accordance with one aspect of the present invention, a radio frequency transmitting apparatus comprises an oscillation stage for generating a plurality N of radio frequency carrier signals having frequencies within a band of radio broadcast frequencies, a signal input for receiving an audio signal, modulators for simultaneously modulating respective ones of said plurality N of radio frequency carrier signals with said audio signal, and a transmission stage for simultaneously transmitting said plurality N of modulated radio frequency signals.

BRIEF DESCRIPTION OF THE DRAWINGS

The preferred embodiment of the invention will be described with reference to the accompanying Drawing in which:

FIG. 3-$b$ illustrates an exemplary graph showing signal level vs. frequency at 19 kHz;

FIG. 3-$c$ illustrates an exemplary output vs. frequency characteristic of summing network 141;

FIG. 4-$b$ illustrates an exemplary graph, in a form of signal level vs. channel, showing the open channels and the channels occupied by the local FM broadcast stations in a particular geographical region;

FIG. 4-$c$ illustrates an exemplary graph, in a form of signal level vs. channel, showing interferences between the signals transmitted by the FM transmitter and the signals broadcasted by the local FM broadcast stations in the same geographical region as in FIG. 3-$b$.

In the various Figures, the same or similar elements and signals are identified in the same manner.

DETAILED DESCRIPTION OF INVENTION

The present invention concerns an RF transmitter for transferring audio signals, particularly stereo audio signals, from a first device to at least one other second device. The first device is contemplated to include such devices as a compact disc (CD) player or a cassette player. The second device can include an FM or AM broadcast radio receiver system. For instance, the invention will allow transfer of a stereo audio signal from a portable CD player or a portable stereo cassette tape player to an FM broadcast radio receiver. The audio signal is reproduced by the speakers which are part of the FM receiver system (hereinafter FM receiver). The transmitter of the invention can be adapted to operate in the frequency of FM broadcast radio, and the transmission level of the FM transmitter can be adapted not to exceed 250 microvolts ($\mu$V) per meter at 3 meters on one channel within a 200 kilohertz (kHZ) bandwidth in the range of 88–108 megahertz (MHz) and not to exceed 150 $\mu$V per meter at 3 meters on each one of the remaining channels within a 200 kilohertz (kHZ) bandwidth for each channel in the range of 88–108 megahertz (MHz) (FCC Rules, Part 15, ¶115.239, sub part C).

Figure 1:
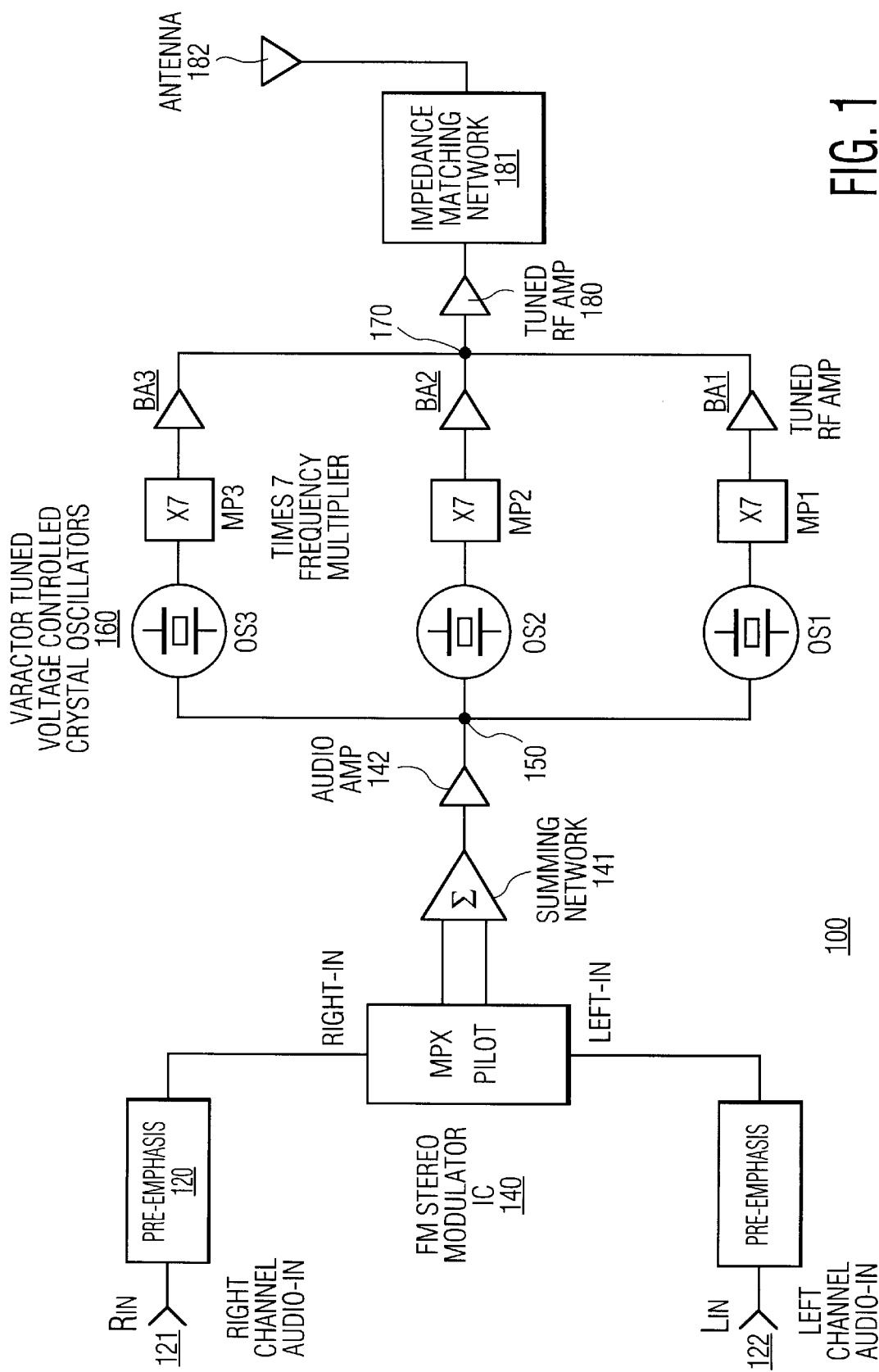
FIG. 1 shows a block diagram of an FM transmitter including three crystal oscillators having respective different oscillation frequencies and one modulator IC for modulating the three oscillated carrier signals respectively with the same audio input signal in accordance with respective aspects of the present invention.

With reference to FIG. 1, which illustrates a block diagram of a preferred embodiment of a transmitter according to the invention, a simultaneous broadcast of multiple frequencies is provided for reception by at least one receiver (not shown). More specifically, FIG. 1 illustrates a transmitter which is capable of simultaneously transmitting on three standard broadcast channels in an FM broadcast band. The transmitter of FIG. 1 can be realized by an FM stereo modulator IC and standard discrete circuitry. The transmitter can be built into a cassette player or CD player or can be made as a separate transmission adapter device.

Figure 2:
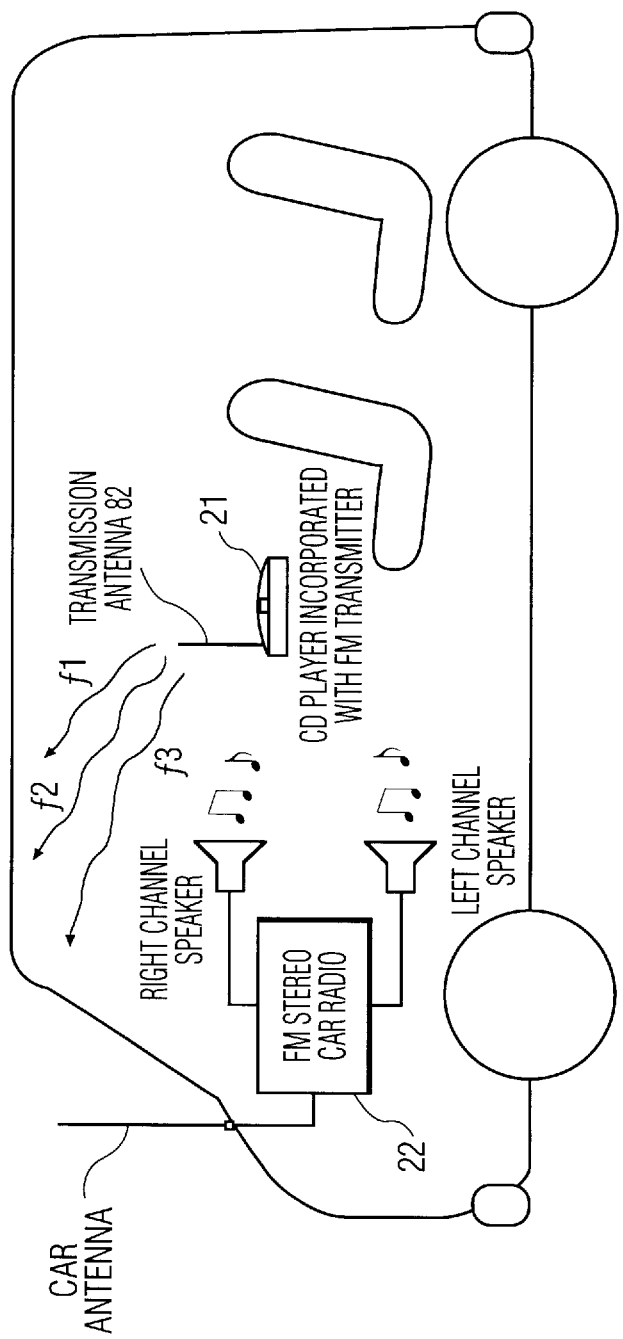
FIG. 2 illustrates an exemplary application of the FM transmitter, attached to a portable stereo CD player, with a car FM stereo receiver.

FIG. 2 illustrates a perspective view of a built-in transmitter in CD player 21 wherein CD player 21 is played back through car radio 22 of the automobile passenger compartment. As mentioned above, the transmitter can also be embodied as a separate unit attached to an audio signal producing device, such as a portable CD player. For that embodiment, the audio signal may be received from a line out or headphone jack of the audio device for transmission through the transmitter. In operation of the invention, radio receiver 22 to which the FM signals will be transmitted, is tuned to one of the frequencies of the simultaneously transmitted signals. In this manner the operator will be able to hear the radio program from CD player 21 through radio receiver 22.

In FIG. 1, pre-emphasis is accomplished for both audio channel inputs, Right Channel Audio In 121 and Left Channel Audio In 122. The pre-emphasis is necessary to counter act the de-emphasis feature of current FM radio receivers. FM stereo modulator IC 140 can be of the type commercially available from ROHM® or JRC®. Specifically, these are ROHM BA1404 and JRC NJM 2035. FM stereo modulator 140 receives audio input from inputs labeled $R_{IN}$ and $L_{IN}$, being representative of right and left channel audio inputs, respectively.

At output terminal MPX, FM stereo modulator 140 produces a signal output representative of the sum of the left and right audio inputs, L+R, to modulator 140, as well as a signal output representative of the difference between the left and right audio inputs, L–R. The L–R signal output is generally centered about 38 kHz or twice the standard FM pilot signal frequency of 19 kHz.

Figure 3A:
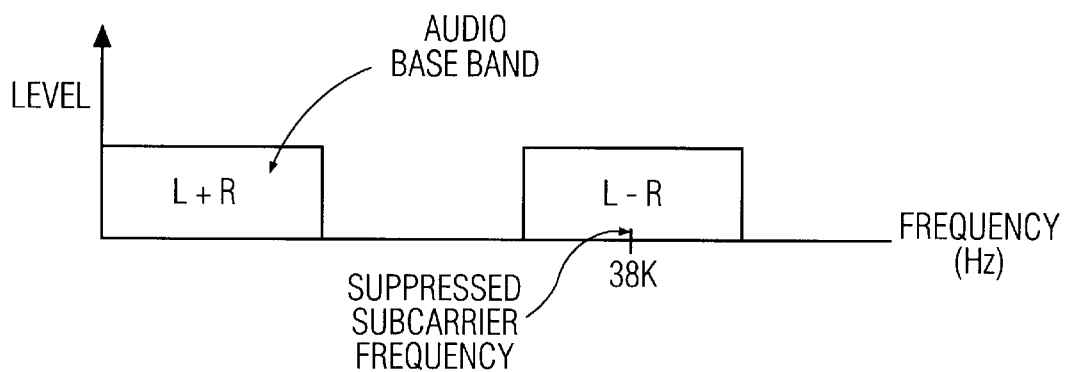
FIG. 3-$a$ illustrates an exemplary graph of signal level vs. frequency.
Figure 3B:
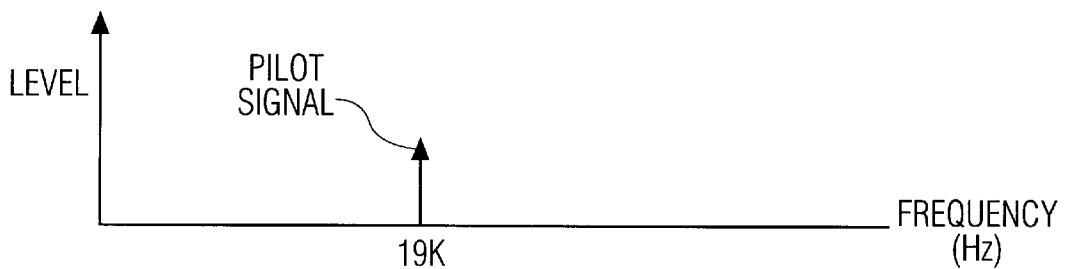
Figure 3C:
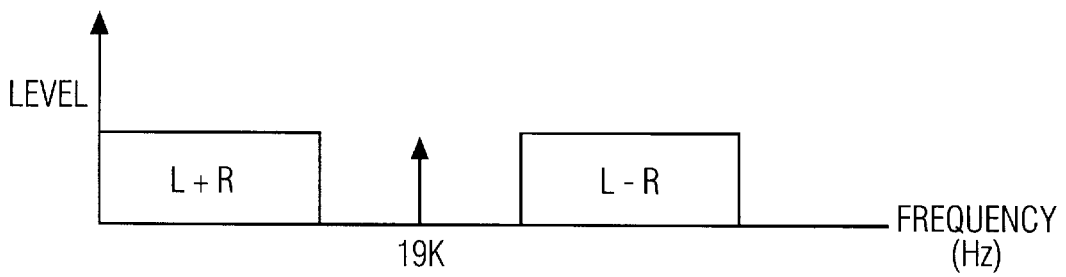

In FIG. 3-a, the characteristic of the MPX output signal, which represents a multiplexed output, is illustrated by the graph of signal level (e.g., decibels (dB)) versus frequency. More specifically, the suppressed subcarrier frequency is indicated at the frequency of 38 kHz, and the audio baseband component and the audio component modulated on the subcarrier are described as L+R and L–R respectively.

A pilot frequency, also output by FM modulator 140, to be transmitted to a receiver, indicative of a transmission of an FM stereo broadcast, is illustrated in FIG. 3-b by a graph showing level vs. frequency for a pilot frequency at 19 kHz.

In FIG. 1, the pilot frequency signal and MPX output signal of FM stereo modulator IC 140 are summed by summing network 141. The output of summing network 141 is illustrated in FIG. 3-c which shows signal level versus frequency.

With reference back to FIG. 1, the output from summing network 141 is amplified by amplifier 142 and then distributed at node 150 to subsequent oscillator section 160 which includes three oscillators OS1, OS2, and OS3.

Figure 4A:
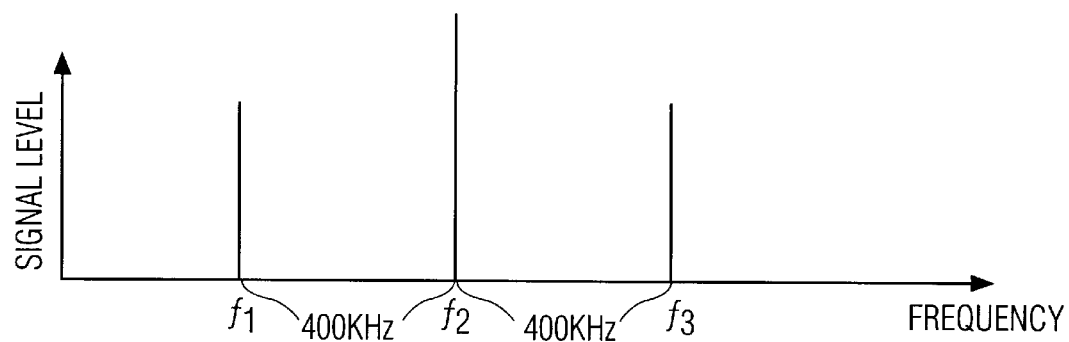
FIG. 4-$a$ illustrates an exemplary graph showing signal level vs. channel frequencies with respect to the three output signals of the FM transmitter.
Figure 4B:
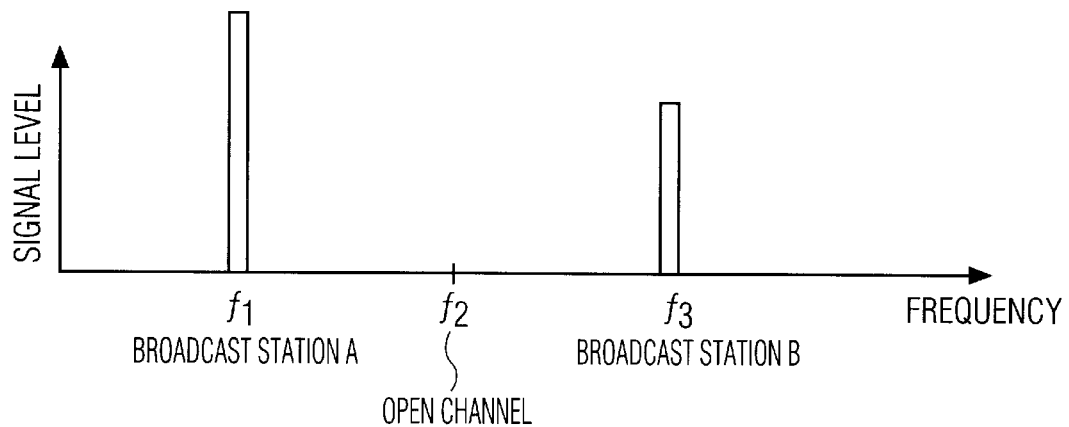
Figure 4C:
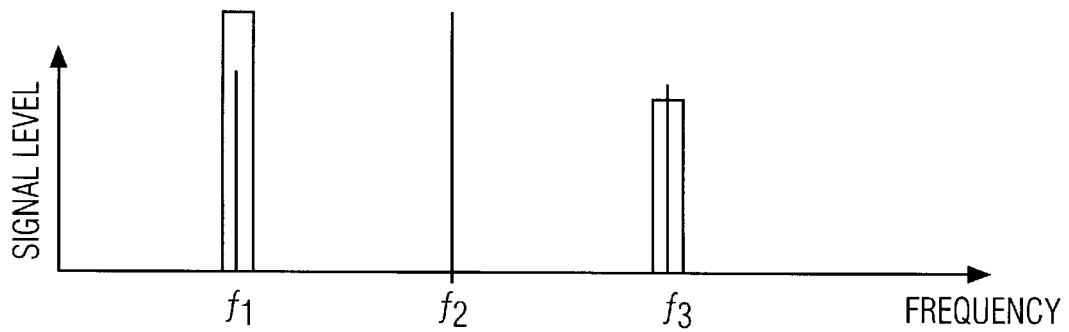

Three oscillators OS1, OS2, OS3 are FM oscillators, and they are preferably varactor-tuned voltage controlled crystal oscillators, each one of which comprises a field effect transistor. Each oscillator provides frequency modulated RF signal for its respective distributed input signal from amplifier 142. The oscillation frequency of each oscillator can be either randomly or successively spaced apart from one another at intervals of a preselected frequency number so that each one of the oscillation frequencies, after frequency multiplication by its respective frequency multiplier, falls in one of the FM broadcast channels. In a preferred embodiment, the oscillation frequency of each oscillator and multiplier section is successively spaced at intervals of 400 kHz as shown in FIG. 4-a. Yet another embodiment of the invention uses four oscillation frequencies successively spaced apart at intervals of 200 kHz.

In the case of transmitting FM radio signals, the implementation of crystal oscillators is desirable since the frequency stability of an FM transmitter needs to be as good as that of current commercial broadcast stations. This is because modern PLL synthesized FM radio receivers are designed to be tuned in discrete frequency steps without employing an automatic frequency control (AFC) circuitry which makes the receiver lock on to a drifting received station. The reduction of the frequency drift in the transmitter allows the driver to operate the vehicle radio receiver in the same manner as tuning to a normal broadcast station without having to continually retune the transmitter.

FIGS. 4-a, 4-b, and 4c describe an exemplary situation where the driver may wish to retune the radio receiver to another simultaneously transmitted signal. FIG. 4-a shows a graph of signal level vs. frequency for FM radio signals being transmitted simultaneously by the transmitter. FIG. 4-b exemplary shows a particular situation where two broadcast signals f1 and f3, transmitted by respective broadcast radio stations A and B, can be received at one geographical location. FIG. 4-b further indicates that the signal strength of f1 is larger than that of f3 at that particular location. FIG. 4-c shows that of the three transmitted signals by the transmitter, the signal on frequency f2 can be received without any interference with the existing broadcast signals if there are no broadcast signals at f2. However, this situation would change as the FM radio receiver in the car moves to other geographical locations. For example, in another location, there may be a strong broadcast radio signal on f2 or f3 transmitted from a local broadcast station. Under such circumstances, the driver may want to select the signal on f1 if it does not have an interference with the local broadcast stations.

Figure 5:
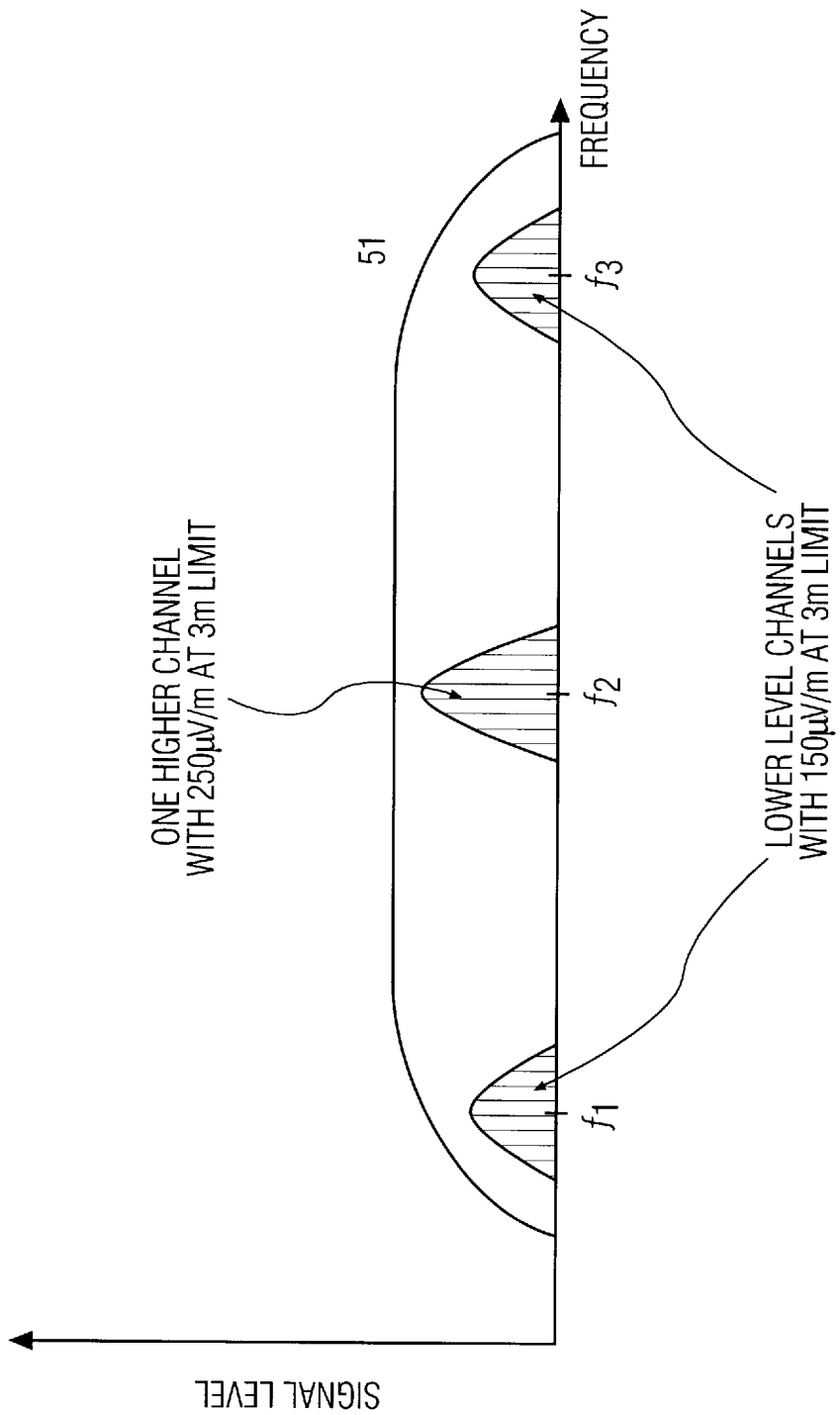
FIG. 5 illustrates an exemplary graph of signal level vs. frequency with amplification centered around a specific frequency for a respective oscillator and frequency multiplier section frequency.

Returning to FIG. 1, the RF signal outputs of oscillators OS1, OS2, and OS3 are input to respective seven times frequency multipliers MP1 through MP3 and their respective frequency tuned buffer amplifiers BA1 through BA3, which provide buffering and signal amplification of an associated signal. It is herein recognized that the oscillator multiplier stage could also be realized as a single stage overtone oscillator. Each buffer amplifier is frequency tuned so as to provide amplification over a limited range of RF frequencies. A graph of level versus frequency with amplification centered around a specific frequency, e.g. f1, f2, f3 for each respective oscillation frequency is illustrated in FIG. 5 over the FM frequency range of 88 MHz to 108 MHz. The output signal of each buffer amplifier is combined at node 170 and then supplied to subsequent amplifier 180.

Amplifier 180 amplifies over a range of frequencies, the RF signals received from buffer amplifier sections BA1, BA2, and BA3. This amplification level is illustrated as graph characteristic 51 as shown in FIG. 5. Output impedance matching network 181 matches the impedance on a transmission antenna, such as helical whip antenna 182 for maximum power transfer of the signal from the transmitter.

Although the invention has been described in detail herein with reference to its preferred embodiment and certain described alternatives, it is to be understood that this description is by way of example only, and it is not to be construed in a limiting sense. It is also herein recognized that the transmitter of the invention can be adapted to operate according to other modulation techniques suitable for the intended radio receiver. For instance, the transmitter can simultaneously transmit on amplitude modulation (AM) radio channels for reception by an AM radio receiver. It is contemplated that all such changes and additional embodiments are within the spirit and true scope of the invention as claimed below.

What is claimed is:

1. An audio player for the use in a moving vehicle in which a radio receiver is installed for receiving broadcast radio signal in different geographical locations, comprising:

means for retrieving an audio signal from a pre-recorded medium;

signal distributing means coupled to said audio signal retrieving means for distributing said audio signal to a plurality N of radio frequency (RF) carrier generating means;

said RF carrier generating means for simultaneously providing a plurality N of modulated RF carrier signals within a band of radio broadcast frequencies;

signal combining means for combining and transmitting said plurality N of modulated RF carrier signals; and wherein (i) said RF carrier generating means comprises a number, N, of individual crystal controlled oscillators for generating respective ones of said plurality, N, of modulated RF carrier signals;

(ii) the plurality N of RF carrier signals and the respective number of respective individual crystal controlled oscillators being at least three (N=3) and at most a number that is substantially less than the total number of broadcast radio signal channels assignable to the FM radio band;

(iii) the frequency spacing of said RF carrier signals being a selected one of 200 kHz and 400 kHz between adjacent ones of said RF carrier signals; and wherein (iv) a selected one of said RF carrier signals exhibits a field strength greater than that of any of the remaining RF carrier signals.

* * * * *

UNITED STATES PATENT AND TRADEMARK OFFICE
CERTIFICATE OF CORRECTION

PATENT NO : 5,862,235
DATED    : Jan.19, 1999
INVENTOR(S): David Anthony Kowalczyk It is certified that error appears in the above-identified patent and that said Letters Patent is hereby corrected as shown below:

On the title page, in the title,

Delete the word "ARRANGMENT" and substitute with --ARRANGEMENT--.

Item [73],

Delete the word "Thomas" and substitute with --Thomson--.

Signed and Sealed this

Twenty-fifth Day of May, 1999

Attest:

Q. TODD DICKINSON

*Attesting Officer*    *Acting Commissioner of Patents and Trademarks*